United States Patent
Uematsu et al.

[11] 3,758,563
[45] Sept. 11, 1973

[54] PROCESS FOR PRODUCING GRANULAR POTASSIUM SORBATE

[75] Inventors: Eiji Uematsu; Katuharu Nakada; Toshihumi Arakawa, all of Niigata, Japan

[73] Assignee: Daicel Ltd., Osaka, Japan

[22] Filed: June 21, 1967

[21] Appl. No.: 647,663

[30] Foreign Application Priority Data
June 22, 1966   Japan.............................. 41/40523

[52] U.S. Cl............................................. 260/526 N
[51] Int. Cl............................................ C07c 51/00
[58] Field of Search............................... 260/526 U

[56] References Cited
UNITED STATES PATENTS

| | | | |
|---|---|---|---|
| 3,173,948 | 3/1965 | Probst et al. | 260/526 |
| 3,320,307 | 5/1967 | Kerr | 260/526 |

FOREIGN PATENTS OR APPLICATIONS

| | | | |
|---|---|---|---|
| 986,503 | 3/1965 | Great Britain | 260/526 |

OTHER PUBLICATIONS

Perry Chemical Engineers' Handbook, McGraw-Hill, New York (1950), pages 1115, 1118

McCabe et al., Unit Operations of Chemical Engineering, McGraw-Hill, New York (1956), pages 201–204

Weissberger, Technique of Organic Chemistry, Vol. III, part II, pages 184, 185.

Primary Examiner—James A. Patten
Attorney—Woodhams, Blanchard and Flynn

[57] ABSTRACT

A granular potassium sorbate, for use as a food and drink preserving material, which is higher than powdery potassium sorbate in apparent specific gravity, is very easily soluble and is sufficiently hard as not to break in handling. A process for producing the above-mentioned granular potassium sorbate by properly wetting powdery potassium sorbate with water alone or with a mixture of water and an organic solvent, molding it with particular types of extruding granulators under proper conditions and drying it.

8 Claims, 6 Drawing Figures

Patented Sept. 11, 1973
3,758,563
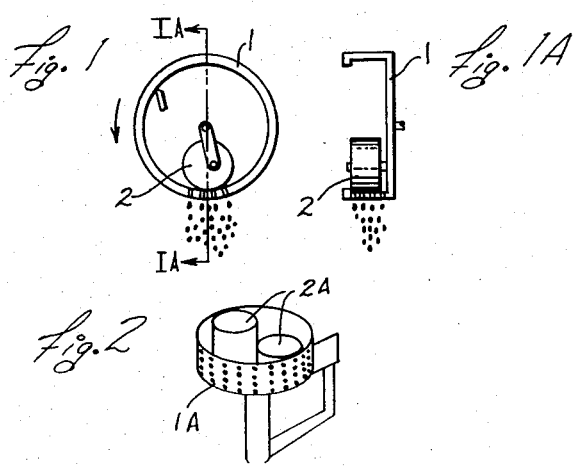
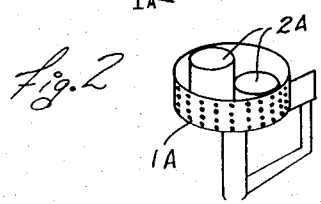
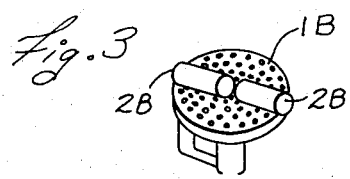
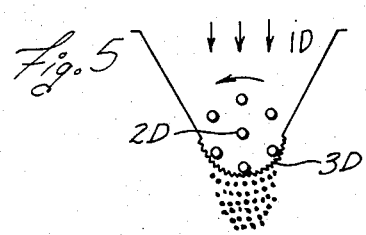
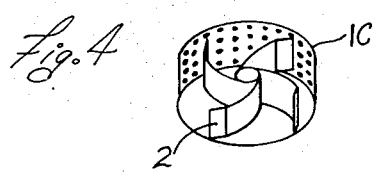
INVENTORS
EIJI UEMATSU
KATUHARU NAKADA
TOSHIHUMI ARAKAWA
BY
Woodhams, Blanchard & Flynn
ATTORNEYS

PROCESS FOR PRODUCING GRANULAR POTASSIUM SORBATE

BACKGROUND OF THE INVENTION

1. Field of the Invention

This invention relates to granular potassium sorbate of high quality and a process for producing the same.

The term "granules" and derivatives thereof shall have reference to small columnar, spherical or cubic grains.

2. Description of the Prior Art

Potassium sorbate is well known as a food preserving material. It has excellent moldproofness and nontoxicity as compared with many other similar substances. Particularly it is so easily soluble in water, as compared with sorbic acid which has the same food preserving effect, that it is very convenient to add and use in foods. Therefore, it is a very useful substance, the demand for which has recently greatly increased.

There is known a method of producing potassium sorbate wherein sorbic acid and potassium hydroxide or a potassium salt, such as potassium carbonate, are made to react with each other in a water phase or in a phase of an organic solvent, such as ketones, hydrocarbons or alcohols, so as to produce crystals of potassium sorbate and said crystals are then separated and dried. However, since the potassium sorbate products as thus obtained are all in the form of crystalline powder, the workability of the powder in handling has been inevitably low in general. Particularly, when it is added to water, it will remain floating on the surface and will hardly quickly dissolve. Further, because of its dust-like condition, it is likely to scatter so that the environments in which it is handled, such as during its packing or its addition to foods, are bad and the powder will be lost. In addition, there is a further defect that it is so voluminous that the packing material cost will be considerable.

We have found that such defects are as mentioned above can be eliminated by providing a novel granular product of potassium sorbate which is very useful to consumers.

SUMMARY OF THE INVENTION

The granular potassium sorbate product according to the present invention is comprised of small columnar, spherical or cubic grains of potassium sorbate which are uniform in their shape and have the following physical properties: (1) the apparent specific gravity is 0.40 to 0.85, (2) the hardness, represented by the load in grams until the granule breaks, is more than 20 g., (3) the solubility, represented by the time in minutes required until 50 g. of granules placed into 300 c.c. of water contained in a vessel completely dissolve, is less than 4 minutes and (4) the $T$ value, which is a value corresponding to the light transmission at 430 m$\mu$ through a liquid layer of 1 cm. thick of a 20 percent aqueous solution of the granular potassium sorbate measured with a spectrophotometer as represented in percent compared with the light transmission through a water layer of the same thickness which is a measure for judging the color of the product, is more than 90. That is, $T$ = light transmission of sample/light transmission of water × 100

Further, with respect to the columnar granular product, it should have a diameter or width of about 0.5 to 2 mm. and a height of about 0.5 to 40 mm. and, with respect to the spherical or cubic granular product, it should have a diameter or width of about 0.5 to 2 mm.

The granular product as above defined is very easy to handle, has several economic advantages, such as the reduction of the loss due to scattering and packing cost, can dissolve quickly in water when it is to be used as a food additive and, therefore, it is a substance very useful to users.

Other advantages of the granular product of the present invention will be easily understood from the following description concerning the process for producing said granular product of potassium sorbate according to the invention.

There is already well known in the art of producing granules from powder a method wherein powders are wetted and mixed, are then applied to a roller, extruder, compressor or mixer and are further passed, if necessary, through a processing step so as to be granulated. However, potassium sorbate has its own inherent physical properties which are different from flour or powders of crystalline inorganic compounds. Particularly, since it is a very unstable substance which is likely to change in quality in the presence of oxygen or water, and since it is not allowed to have any filler added therein for facilitating the granulation, in view of its use as a food preserving material, prior attempts to make granules of potasssium sorbate were inevitably accompanied with the reduction of the quality and various difficulties in the granulation operation.

In view of the fact that, in a process for producing granular potassium sorbate, the maintenance of the form and also the maintenance of quality of the product are both very important factors, we have investigated the influence of water and solvent on the lowering of the quality of potassium sorbate, such as changes in the quality and coloring in the step of producing potassium sorbate and the conditions for the granulation and drying and could find several significant conditions for producing the granular potassium sorbate product. According to the process of the present invention, granular products of a high quality can be easily produced without any difficulties in the operation.

The potassium sorbate to be used in the process for producing the granular product according to the present invention may be either a dried crystalline powder or wet crystalline powder wetted with water and/or an organic solvent. The potassium sorbate powder can be obtained by the neutralization reaction of sorbic acid and potassium hydroxide or potasssium carbonate in water and/or an organic solvent so as to produce potasssium sorbate in said liquid phase and then separating the same. However, in view of the fact that the granulating step is carried out following the above-described step of making potassium sorbate, the wet crystalline powders are economically advantageous.

The process for producing the granular potassium sorbate product is carried out as follows: With respect to the dry potassium sorbate powder, it should be wetted with a suitable amount of water or with water and an organic solvent. With respect to the wet crystalline powdery products of potassium sorbate as separated from the liquid reaction phase and containing water and/or organic solvent therein, water and/or organic solvent should be suitably removed from or added to the wet products, considering the amounts of water and/or organic solvent already contained in said wet products, so that the powder contains a suitable amount of water or water and organic solvent. The thus obtained wet crystalline powders of potassium sorbate, which should be kept in a proper homogeneous wet state by mixing it as required, should be then applied to an extruding molding machine of a type which can apply not only an extruding force but also lateral stress to the extruded material. The granules of potassium sorbate can be extruded from the machine under proper conditions as will be hereinafter described. Said granules should then be dried under proper conditions as will be also hereinafter described.

In the above process for producing the granular potassium sorbate, there should first be prepared wet potassium sorbate having appropriate water and organic solvent contents. Water is the essential component of the wetting liquid. Wet potassium sorbate powders moistened only with water can be easily granulated. However, the combination of water and an organic solvent will be more preferable as the wetting liquid because, by using an organic solvent together with water, the granules themselves will have little tendency to stick to one another after granulation, and the wetting liquid will be more easily volatilized in the subsequent drying step. Thus, the operation of the process will be easier. However, in case an organic solvent alone without water is used as the wetting liquid for the potassium sorbate powder, not only the obtained granular products will be so brittle as to be easy to break, but also the granulating and drying operations will become very difficult.

Accordingly, the amounts of water and organic solvent to be contained in the wet potassium sorbate powder are not only very important to obtain granular products having a stable quality, but also have a close relation with the moldability and workability of wet granules in the granulating step.

We have found that the wet potassium sorbate to be supplied to the granulating step should contain from about 3 to 18 percent, preferably 5 to 12 percent, by weight of water based on the weight of the potassium sorbate powder in case the powder is wetted with water alone. The wet potassium sorbate should contain from about 1 to 18 percent by weight water and less than 60 percent by weight of an organic solvent, preferably 5 to 12 percent by weight water and less than 40 percent by weight of the organic solvent, in case the potassium sorbate is wetted with water and organic solvent. But, in the latter case, even in said preferable ranges, when more than 8 percent by weight of water is used and more than 15 percent by weight of the organic solvent is used with said relatively high content of water, the wet granular product will generally begin to show a tendency to block. Therefore, it is necessary to decrease the mixing ratio of the organic solvent in these cases. When the water content is too high or the content of the organic solvent is too high, particularly when it is used with a relatively high content of water, the wet powder or the molded wet granules will become so sticky that the granules themselves extruded out through the mouth piece of the machine will stick to one another, thus making the granulating operation difficult, and the extruded granules will be likely to be deformed in the subsequent drying step so that the granular forms will become irregular. Further, the powder or granules of potassium sorbate will be deposited on the walls of the granulating apparatus and will stay a long time in the apparatus during the mixing, granulating and drying steps of the granules will become blocks which will require a long time to dry and will therefore be exposed to the drying air for a long time. In these cases, the potassium sorbate will be changed in quality or colored during the operation and, therefore, the quality of the products will be remarkably reduced. Further, when the moisture content is too low, the powder will be so low in fluidity as to be difficult to granulate, the molded products will generally tend to become powder and, therefore, it will be difficult to obtain satisfactory granules. However, when the contents of the water and organic solvent in the wet crystalline powders which are to be supplied to the granulator are kept in the above-mentioned range, the granulating operation will be easy to carry out and the desired product will be obtained.

The preferred organic solvents that can be used in the above-mentioned process of the present invention include toluene, acetone, methanol and heptane. However, any other organic solvents which have a boiling point in the range of 50° to 110°C. and which can be quickly volatilized in the drying step after the granulation and which are not reactive with potassium hydroxide and potassium carbonate, when the granulating step of the present invention is carried out in the same solvent following the production of potassium sorbate, can advantageously be used.

Potassium sorbate uniformly wetted with water alone or with water and an organic solvent in such a manner as described above is then supplied to an extruder equipped with a die having the desired shape to obtain extruded granules of the desired shape. There are already known various granulating methods. However, we have found that extruding granulating methods and apparatuses wherein not only the extruding force but also lateral stress will be applied to the material to be extruded will be most preferable. Suitable granulators for the purposes of the present invention include granulators which are provided with rolls and a die or with rotary extruding blades and a die. By properly selecting the kind and orifice diameter and shape of the die, columnar or prismatic granules of any dimensions can be obtained.

Suitable granulating extruders for the purposes of the present invention are schematically illustrated by way of example in the attached drawing, in which:

FIG. 1 illustrates an extruder in which an extruding roll is positioned within a cylindrical extruding die;

FIG. 1A is a sectional view taken along the line IA—IA of FIG. 1;

FIG. 2 is a view similar to FIG. 1 showing a modification;

FIG. 3 is a view showing a modfied extruder;

FIG. 4 is a view showing a further modification of the extruder;

FIG. 5 is a view showing yet another modification of the extruder.

FIGS. 1 to 5 show diagrammatic views of several types of granulators wherein not only extruding force but also lateral stress will be applied to the material to be extruded. Granulators provided with rolls and a die are divided into three types: (1) a granulator in which the cylindrical die 1 will be rotated against the roll 2 (FIG. 1), (2) a granulator wherein the rolls 2, 2A will be rotated against the cylindrical die 1A (FIG. 2) and (3) a granulator wherein the rolls 2B will be rotated against the flat and horizontally placed die 1B (FIG. 3). Further, FIG. 4 shows a granulator wherein the rotary extruding blades 2C are rotated against a cylindrical die 1C. FIG. 5 shows an oscillating granulizer wherein six metal rods 1D are arranged at equally radially and circumferentially spaced intervals about a central shaft for rotation therewith and the powder is extruded through the wire-netting 3 in the form of granules.

In extruding granulators in which only an extruding force is applied to the wet powder, such as granulators in which a screw is used for extruding the material, the wet powder will not flow well due to the bridging of material near the die and will not be able to be granulated. However, by using extruding granulators wherein lateral forces will also be applied to the material as it enters the extruding die, the granulation can be successfully carried out without such trouble.

Further, it is noted that in order to make the granulating operation easy and to obtain uniformly shaped granules of potassium sorbate, it is essential to carry out the granulation by predetermining properly the extruding force at the time of the extruding granulation and the peripheral velocity of the rotary die or rolls or blades. That is to say, it is necessary that, when wet potassium sorbate is to be extruded out through a die of a granulator, the extruding compressive force applied to the wet powder by the rolls or rotary blades should be 10 to 50 kg./cm$^2$, preferably 20 to 40 kg./cm$^2$, and the peripheral velocity of the rotary die or rolls or blades should be 1.0 to 3 m./sec., preferably 1.4 to 2.6 m./sec. When the extruding compressive force and the peripheral velocity are below the above ranges during the operation, it will be difficult to extrude granules through the die orifices and, even if granules could be extruded, they will be brittle and will be likely to break. When the extruding compressive force and the peripheral velocity are above the above ranges, the extruded granules will be irregular in shape and will be fragile.

The wet granules, which may be in columnar, prismatic or other shapes as obtained from the granulator, can be made to spherical or flat granules by an after-treatment using a spherizing machine or a compressing machine.

Thus, in the granulating process according to the present invention, it is particularly important to maintain the physical properties of the wet powder to be extruded and the extruded granules of potassium sorbate, such as hardness of the granules and the moldability of the wet powders, above the desired level. However, in the present invention, it is also very important to obtain products which are not colored. We have found that, in the process described above, the coloring of the dried granules will be considerably influenced by the water content of the wet powder or granules and the time that elapses between making the wet potassium sorbate powder and the drying of the granules thereof. That is to say, when the water content is more than 1 percent by weight and the elapsed time between making the wet potassium sorbate powder and drying the granules thereof is long, the coloring will increase as the water content and elapsed time increases. Therefore, it is desirable to carry out the granulation and the drying step within several hours or preferably less than 2 to 5 hours depending on the content of water after the crystalline powder of potassium sorbate is made to contain water. It should be absolutely avoided to leave the potassium sorbate powder in contact with water for more than 10 hours.

The wet granules obtained from the granulator are then dried by any conventional drying method, such as aeration or vacuum drying, and a granulated potassium sorbate product can be obtained. However, in the case of drying a large amount of wet granules of potassium sorbate, the wet granules tend to stick to one another when they are piled up during the drying step. Therefore, it is desired to carry out first a preliminary fluidized drying treatment to reduce the moisture content of the wet granules to less than 2 percent by weight immediately after the granulation. Then the conventional drying can be carried out without any trouble. The fluidized drying mentioned here is a method wherein a hot gas stream is blown up from below through a perforated plate having a proper perforation size and porosity which is provided in the bottom of a vessel. The material to be dried is placed on the perforated plate and is dried as if it is supported in the form of a fluidized bed above the plate.

It is preferable that such preliminary fluidized drying should be carried out with a hot gas stream which will have a sufficiently high temperature to volatilize the moisture content, but not deteriorate the quality of potassium sorbate, and which will have a sufficiently high velocity to effect the fluidizing of the granules, but not so high as to scatter the granules. Accordingly, a gas temperature of more than 30°C., preferably of 40° to 80°C. and a gas velocity of 0.8 to 2.0 m./sec., preferably 1.2 to 1.7 m./sec., are generally preferred in the practice of the fluidized drying.

The thus obtained granular potassium sorbate of the present invention will not have the various defects of the conventionally used powder products of potassium sorbate. That is to say, the fluidity is remarkably improved, the apparent specific gravity is increased and the handling is very convenient. The $T$ value is more than 90 and, therefore, the granules are high in whiteness and are beautiful. The hardness is more than 20 g. and therefore the granules will be little broken during the transportation and handling. Further, what is to be particularly noted about the granule-producing process according to the present invention is that the time required in the drying step can be reduced to be about one-half the time required in the case of drying the moisture-containing crystalline powder after the separating step in the conventional process for producing potassium sorbate. Although the moisture content in the wet granules coming out of the granulator in the present invention is substantially the same as in the powder after the liquid separating step for obtaining the powder product in the prior art process, the time required in the drying step can be remarkably reduced due to the characteristic of the product being granular. This is an entirely unexpected effect and is also another remarkable economic effect of the present invention.

DESCRIPTION OF THE PREFERRED EMBODIMENTS

Examples 1 to 6

Six samples were prepared. Each sample was prepared by placing 100 parts of a dried crystalline powder of potassium sorbate into a mortar. While the powder was being stirred, a predetermined amount of water was gradually added to it and the powder was mixed for 5 minutes to obtain wet potassium sorbate. The amounts of water added to the samples were 3, 9, 10 parts (3 samples) and 18 parts by weight, respectively. Each wet powder of potassium sorbate, except two samples as described below, was immediately supplied to a roll-die rotary die type extruding granulator having a round orifice die having orifice diameters of 1 mm. and was granulated under the conditions of a peripheral velocity of the die of 2.2 m./sec. and a roll pressure of about 30 kg./cm² to obtain 108 parts of columnar wet granules of a diameter of 1 mm. and a length of 10 to 20 mm.

However, two samples containing 10 parts of added water were supplied to the granulator after being left in air respectively for 5 and 15 hours after being wetted with water.

When the thus obtained wet pellets were placed on a perforated plate of a porosity of 10 percent having round perforations of a diameter of 0.3 mm. and were subjected to fluidized drying for 10 minutes under the conditions of a hot air stream temperature of 60°C. and an air stream velocity of 1.4 m./sec., the water content became 1.2 percent by weight. When these granules were then vacuum-dried for 2 hours under the conditions of a pressure of 50 mm.Hg and a temperature of 80°C., 99 parts of granular potassium sorbate having substantially the same shape as before the drying and of a water content of 0.05 percent by weight were obtained.

The operating conditions and the characteristics of the granular products in these examples are shown in Table 1. In said Table, the term "Good," regarding the granulated state, means that, during the granulation, the wet granules were smoothly extruded and their forms were regular. Further, in said Table, solubility is represented by the time in minutes required for 50 g. of the granular products sprinkled on 300 c.c. of water in a beaker to be completely dissolved. The $T$ value is a value corresponding to the light transmission through a liquid layer of 1 cm. thick of a 20 percent aqueous solution of the granular products measured with a spectrophotometer (430 $\mu$) as represented in percent compared with the light transmission through a water layer of the same thickness. The hardness is the weight in grams of the load applied to any one grain of a group of granular products until it broken and is represented by the upper and lower limit values in 10 measurements.

TABLE 1

| | Water content in percent | Time in hours[1] | Granulated state | Characteristics of granular products | | | | |
|---|---|---|---|---|---|---|---|---|
| | | | | Dimensions, mm. | Apparent specific gravity | Hardness, g. | Solubility, min. | T value |
| Example No. | | | | | | | | |
| 1 | 3.0 | 0 | Tended to powder | 1 x 1~5 | 0.60 | 60~440 | 2.0 | 96.0 |
| 2 | 9.0 | 0 | Good | 1 x 10~20 | 0.54 | 260~410 | 1.8 | 96.5 |
| 3 | 10.0 | 0 | do | 1 x 10~20 | 0.53 | 250~420 | 1.8 | 94.5 |
| 4 | 18.0 | 0 | (²) | 1 x 20~40 | 0.52 | 110~300 | 1.6 | 93.9 |
| 5 | 10.0 | 5.0 | Good | 1 x 10~20 | 0.53 | 230~400 | 1.8 | 93.1 |
| 6 | 10.0 | 15.0 | do | 1 x 10~20 | 0.53 | 180~320 | 1.8 | 91.2 |

[1] Before granulation after adding water.
[2] The granules were sticky and tended to block.
NOTE: The apparent specific gravity of the raw material potassium sorbate was 0.25, its solubility was 7.5 minutes and its T value was 98.0.

Examples 7 to 9

8.0 percent by weight of water and 3.0 percent by weight of each of organic solvents listed in Table 2 were added to a potassium sorbate powder which had a water content of less than 0.1 percent by weight. The powder was treated as in Examples 1 to 6 to obtain granular products of a water content of less than 0.1 percent by weight. The operating conditions and the characteristics of the products are shown in Table 2.

TABLE 2

| | Water content, percent | Solvent content percent | Granulated state | Characteristics of granular products | | | | |
|---|---|---|---|---|---|---|---|---|
| | | | | Dimensions, mm. | Apparent specific gravity | Hardness, g. | Solubility, min. | T value |
| Example No.: | | | | | | | | |
| 7 | 8.0 | Methanol, 3.0 | Good | 1 x 10~20 | 0.56 | 100~300 | 1.5 | 96.4 |
| 8 | 8.0 | Acetone, 3.0 | do | 1 x 10~20 | 0.56 | 100~300 | 1.5 | 96.7 |
| 9 | 8.0 | Toluene, 3.0 | do | 1 x 10~20 | 0.59 | 75~150 | 1.2 | 96.0 |

For comparison, another wet powder before the granulation in Example 7 was dried with a hot wind at 50°C. without performing the fluidized drying. In 4 hours, the water content was 0.8 percent by weight. The time required until the powder was dried to be of a water content of less than 0.1 percent by weight was 7 hours.

Examples 10 to 17

A suspension of potassium sorbate obtained by making sorbic acid and potassium hydroxide react with each other in each of the solvents methanol, acetone, toluene and heptane was filtered to obtain wet powdery potassium sorbate. By removing organic solvent by volatilization and adding water, the contents of the water and the organic solvent were adjusted to obtain homogeneous wet potassium sorbate. When the powders were treated as in Examples 1 to 6, wet granules were obtained. When they were airdried with a hot wind at 50°C., granular products were produced.

The respective operating conditions and results are shown in Table 3.

Examples 26 to 30

A suspension of potassium sorbate obtained by making sorbic acid and potassium hydroxide react with each other in an acetone solvent was filtered to obtain potassium sorbate containing acetone. The acetone was then evaporated so that the content of acetone was 3 by weight based on the weight of the potassium sorbate. Water was added thereto so as to be 8 by weight. Then the wet potassium sorbate was well mixed.

TABLE 3

| Example No. | Moisture contents | | Characteristics of granular products | | | | | |
|---|---|---|---|---|---|---|---|---|
| | Water content, percent | Solvent content, percent | Granulated state | Dimensions, mm. | Apparent specific gravity | Hardness, g. | Solubility, min. | T value |
| Starting material | 1.5 | Methanol (30%) | | | | | | |
| 10 | 10 | 3 | Good | 10~20 | 0.56 | 75~350 | 1.5 | 94.7 |
| 11 | 10 | 20 | Tended to block | 15~25 | 0.56 | 100~230 | 1.8 | 95.5 |
| Starting material | 1.2 | Acetone (32%) | | | | | | |
| 12 | 10 | 3 | Good | 10~20 | 0.58 | 230~450 | 1.5 | 94.8 |
| 13 | 10 | 20 | Slightly tended to block | 15~25 | 0.54 | 150~410 | 2.2 | 95.8 |
| Starting material | 1.8 | Toluene (48%) | | | | | | |
| 14 | 10 | 3 | Good | 10~20 | 0.59 | 200~380 | 1.2 | 94.3 |
| 15 | 10 | 20 | Partly blocked | 15~25 | 0.56 | 75~150 | 1.8 | 95.2 |
| Starting material | 1.0 | Heptane (36%) | | | | | | |
| 16 | 10 | 3 | Good | 5~15 | 0.45 | 90~360 | 2.0 | 93.2 |
| 17 | 10 | 20 | Slightly tended to powder | 1~2 | 0.46 | 110~220 | 1.8 | 90.2 |

Examples 18 to 23

Each of the organic solvents methanol, acetone, toluene and heptane was added to a powder of dry potassium sorbate to prepare a wet powder. When it was granulated as in Examples 1 to 6 and the granules were airdried with a hot wind at 50°C. for 4 hours, dry products were obtained. The operating conditions and results are shown in Table 4.

TABLE 4

| Example No.: | Solvents and amounts of addition in % | Granulated state | Remarks |
|---|---|---|---|
| 18 | Methanol (20%) | Powdered. There were many small grains of 0.5 to 1.0 mm. | The powder and small grains as mixed together were discharged out of the granulator. |
| 19 | Methanol (40%) | A little powdery. The granule length was 1.0 to 2.0 mm. | The granularity was very small. Fragile. |
| 20 | Methanol (60%) | The granules were sticky and were high in the tendency to block. | Difficult to granulate. The colored degree of the dry product was high. (The T value was 85.2). |
| 21 | Acetone (40%) | A little powdery. The granule length was about 1 mm. | The granularity was very small. Fragile. |
| 22 | Toluene (40%) | Good. The granule length was 15 to 25 mm. | When added to water, settled in water. The dissolving time was long. (8 minutes). |
| 23 | Heptane (40%) | A little powdery. The granule length was about 1 mm. | The granules was very small. Fragile. The colored degree of the dry products was high. (The T value was 86.7). |

Examples 24 and 25

100 parts of a powder of dry potassium sorbate were placed into a mortar. While the powder was being stirred, 10 parts of water were gradually added to it and the powder was mixed for 5 minutes. Then the powder was granulated with each of two kinds of granulators.

The kinds of the granulators and conditions are shown in Table 5.

The thus prepared wet powder was granulated by varying the roll pressure and the peripheral velocity of the die with the roll-die rotary die type granulator used in Example 24. The conditions and results are shown in Table 6.

TABLE 5

| Example No. | Kinds of granulators | Granulating conditions | Granulated state |
|---|---|---|---|
| 24 | Roll-die rotary type | Die orifice diameter; 1 mm.; Peripheral velocity of die: 20 mm./sec. | Granules of a diameter of 1 mm. and a length of 10 to 20 mm. were made smoothly. |
| 25 | Forwardly extruding screw type | Die orifice diameter: 1 mm.; Piston pressure: 35 kg./cm.$^2$ | Even powder was not discharged out of the die and granulation was impossible. |

TABLE 6

| Example No. | Peripheral velocity of the die in m./sec. | Roll pressure in kg./cm. | Granulated state |
|---|---|---|---|
| 26 | 2.2 | About 10 | Small brittle granules tending to powder were extruded little by little. |
| 27 | 2.2 | About 30 | Columnar granules of a diameter of 1 mm. and a length of 10 to 20 mm. were made smoothly. |
| 28 | 2.2 | About 50 | Irregular but columnar granules of a diameter of 1 mm. and a length of 1 to 2 mm. broken on the periphery were made. |
| 29 | 1.0 | About 30 | Small powdery fragile granules were extruded little by little. |
| 30 | 3.0 | do | Irregular granules of a diameter of 1 mm. and a length of 1 to 3 mm. broken on the periphery were obtained. |

NOTE: Since the amount of the powder staying between the die and roll somewhat fluctuated and therefore the pressure also fluctuated, the roll pressure is shown by the approximate value.

Note: Since the amount of the powder staying between the die and roll somewhat fluctuated and therefore the pressure also fluctuated, the roll pressure is shown by the approximate value.

Examples 31 to 33

The wet granules of a moisture content of 11 percent by weight made by the process in Example 27 were placed on a screen of a porosity of 10 percent having round perforations of a diameter of 0.3 mm. and were fluidized dried for 25 minutes by flowing up a hot gas stream at 60°C. from below the screen. The conditions and results are shown in Table 7.

TABLE 7

| Example No. | Gas stream velocity in m./sec. | Fluidizing state | Moisture content in percent after drying |
|---|---|---|---|
| 31 | 0.7 | Weakly fluidizing to a height of 1 to 2 cm. | 3.2 |
| 32 | 1.4 | Strongly fluidizing to a height of 10 to 15 cm. | 1.8 |
| 33 | 2.2 | The granules scattered and were not fluidizing. The fluidizing drying was impossible. | |

The embodiments of the invention in which an exclusive property or privilege is claimed are defined as follows:

1. A process for producing granular potassium sorbate from a powder thereof, which comprises:
   1. providing a crystalline powder of potassium sorbate uniformly wetted with a liquid selected from the group consisting of (a) water, in which the water is present in an amount of from about 3 to 18 percent by weight, based on the weight of the potassium sorbate, and (b) a mixture of water and an organic solvent in which the solvent has a boiling point in the range of 50° to 110° C., in which the water is present in an amount of from about 1 to 18 percent by weight and in which the amount of the organic solvent is less than 60 percent by weight, based on the weight of the potassium sorbate;
   2. placing said wetted powder in an extruding granulator and applying an extruding force and a lateral stress to the wetted powder by effecting relative lateral movement between extruding means and an apertured die positioned in close proximity to said extruding means in order to extrude the wetted powder through said die so that said wetted powder is formed into granules, and
   3. then drying the granules extruded from the granulator, whereby to obtain granules having a transverse dimension of 0.5 to 2.0 mm. and having an apparent specific gravity of 0.40 to 0.85, a hardness of more than 20 g., a solubility in water of less than 4 minutes and a $T$ value of more than 90,
   wherein: hardness is the weight in grams of the load required to break a granule;
   said solubility is the time in minutes required to completely dissolve 50 grams of granules placed in 300 cc. of water;
   $T$ value is a value corresponding to the light transmission, measured with a spectrophotometer at 430 m$\mu$ through a layer of 1 cm. thickness of a 20 percent aqueous solution of said granular potassium sorbate, represented in percent, as compared with the light transmission through a water layer of the same thickness.

2. The process as claimed in claim 1, wherein the wet granules extruded from the granulator are first dried immediately after granulation by placing the granules in a vessel and blowing a hot gas steam upaardly through the vessel so that the granules are maintained in the form of a fluidized bed, to reduce the moisture content of said wet granules to less than 2 percent by weight and then further drying said granules by any conventional drying method.

3. The process as claimed in claim 1, wherein said organic solvent is selected from the group consisting of toluene, acetone, methanol and heptane.

4. The process as claimed in claim 1, wherein said extruding granulator is selected from extruding granulators provided with rolls and a die and extruding granulators provided with rotary extruding blades and a die.

5. The process as claimed in claim 1, wherein the extruding compression force that is applied to the wetted powder to be extruded is 10 to 50 kg./cm$^2$, and the peripheral speed of the rotory die or rolls or blades is 1.0 to 3 m./sec.

6. The process as claimed in claim 2, in which the hot gas has a temperature in excess of 30° C. and a velocity in the range of 0.8 to 2.0 m./sec.

7. The process as claimed in claim 1, in which the liquid consists of water and an organic solvent, in which the water is present in an amount of from about 5 to 12 percent by weight and the organic solvent is present in an amount of less than 40 percent by weight, based on the weight of the potassium sorbate.

8. The process as claimed in claim 1, in which the granules are completely dried within a period of less than 10 hours after the potassium sorbate is made wet.

* * * * *

UNITED STATES PATENT OFFICE
CERTIFICATE OF CORRECTION

Patent No. 3,758,563       Dated September 11, 1973

Inventor(s) Eiji Uematsu, Katuharu Nakada and Toshihumi Arakawa

It is certified that error appears in the above-identified patent and that said Letters Patent are hereby corrected as shown below:

Col. 12, line 33; change "upaardly" to ---upwardly---.

Col. 12, line 39; change "claim 1" to ---claim 7---.

Col. 12, line 46; change "claim 1" to ---claim 4---.

Signed and sealed this 15th day of January 1974.

(SEAL)
Attest:

EDWARD M. FLETCHER, JR.         RENE D. TEGTMEYER
Attesting Officer               Acting Commissioner of Patents